United States Patent

[11] 3,596,512

| [72] | Inventor | Richard W. Bixby<br>Little Compton, R.I. |
|---|---|---|
| [21] | Appl. No. | 641 |
| [22] | Filed | Jan. 5, 1970 |
| [45] | Patented | Aug. 3, 1971 |
| [73] | Assignee | The Sippican Corporation<br>Marion, Mass. |

[54] EXPENDABLE AIR PROBE
5 Claims, 3 Drawing Figs.

[52] U.S. Cl. .................................................. 73/170 A,
244/3.24
[51] Int. Cl. ...................................................... G01d 1/00
[50] Field of Search .......................................... 73/170 R,
170 A; 244/3.24

[56] References Cited
UNITED STATES PATENTS
3,511,092  5/1970  Saunders ..................... 73/170 (A) X

*Primary Examiner*—Jerry W. Myracle
*Attorney*—Nolte and Nolte

ABSTRACT: A device for measuring the characteristics, such as temperature and humidity, of the air above a water surface comprises a probe which is launched in a trajectory over the body of water. The probe is connected to a measuring station by a conducting wire. The measuring probe is designed to have a low speed during descent, and may be in the form of a rotor, or be provided with a drag device such as a parachute to slow its descent.

PATENTED AUG 3 1971

3,596,512

INVENTOR.
RICHARD W. BIXBY

BY Nolte & Nolte

ATTORNEYS

EXPENDABLE AIR PROBE

In order to provide accurate weather forecasts, it is desirable to be able to measure the rate of heat transfer to and from the air. Over the ocean, the air temperature is greatly affected by the exchange between the air and the ocean's surface. This heat exchange is directly dependent upon the temperature and humidity gradients of the air just above the water versus the temperature of the water surface. It is frequently desirable to make the measurements of temperature and humidity gradients from a surface vessel. It has been found, however, that previous techniques for making thermal measurements from a surface vessel are not entirely satisfactory when measuring the characteristics of air just above the surface of the water. Accurate results are only possible if the body of air being measured is not disturbed by the surface vessel and the measuring device, and the use of fixed measuring devices disposed at a distance from the surface vessel renders the measurement time consuming and expensive. It has also been suggested that the measuring devices be projected from the surface vessel in order to make the necessary measurements. The suggested devices for this purpose have not yet provided a capability of recording a temperature profile and immediate surface temperature undisturbed by either the launch ship or the measurement device.

It is therefore an object of this invention to provide an improved expendable measuring device for indicating and recording of the temperature and humidity profile of the air above the surface of a body of water.

According to the present invention, an expendable air probe is provided, which is adapted to be launched in a trajectory from a surface vessel. The air probe is continuously connected to a recording device on the launching vessel, by means of a wire, so that measuring devices such as thermistors on the air probe are continuously connected to a recording instrument. Since the measurements must be taken at some distance from the vessel, it is of course desirable that the probe be launched with a sufficient velocity during the ascending portion of its trajectory that the probe descends at a distance from the vessel such that measurements taken during the descending portion of the trajectory will be uneffected by the vessel. On the other hand, however, it is necessary that the velocity of the air probe during the descending portion of its trajectory be sufficiently slow that relatively slow responding thermal devices, such as thermistors, can provide an accurate indication of the existing condition of the atmosphere. It has been found that the flight characteristics of the air probe must differ during the ascending and descending portions of the trajectory in order to provide a practical device.

According to one embodiment of the invention, the variation in the flight characteristics of the air probe is accomplished by providing a probe in the form of a rotor. In this embodiment, the rotor, which may have a central wire coil connected to the recording instrument and adapted to be paid out during the flight of the device, is provided with a rotational movement and directed upwardly along the axis of the rotor during the launch. As the rotor moves along the projectory, its axis gradually changes direction, for example, due to the distribution of weight within the body of the rotor, so that during the descending portion of the trajectory the axis of the rotor is substantially vertical. The vanes of the rotor are positioned with respect to its axis to provide a lifting force, so that as the rotor rotates during descent, its downward velocity is decreased to an extent that permits accurate measurement of the temperature profile of the atmosphere over the water.

The rotor may also be provided with a wet-bulb thermistor in order to provide a measurement of humidity, and in addition, the rotor may be provided with a sea electrode that provides an indication at the recording device of the time at which the rotor falls into the sea. The thermal measurements by the device may continue as the device descends into the sea, thereby providing a measurement of the upper layers of the sea water, which are not generally measurable by current bathythermograph systems.

According to another embodiment of the invention, the probe is in the form of a missile which may include a coil of wire connected between the thermistor on the missile and a shipboard apparatus. In this arrangement, the missile is provided with a releasable drag device, such as a parachute, which is adapted to be released, for example automatically by a delay device, at the highest altitude of the trajectory, in order to slow the descent of the missile. As in the case of the embodiment of the invention employing a rotor, the missile may also include a wet bulb thermistor and a sea electrode.

The invention will now be described in more detail with reference to the accompanying drawing, in which.

Figure 1:
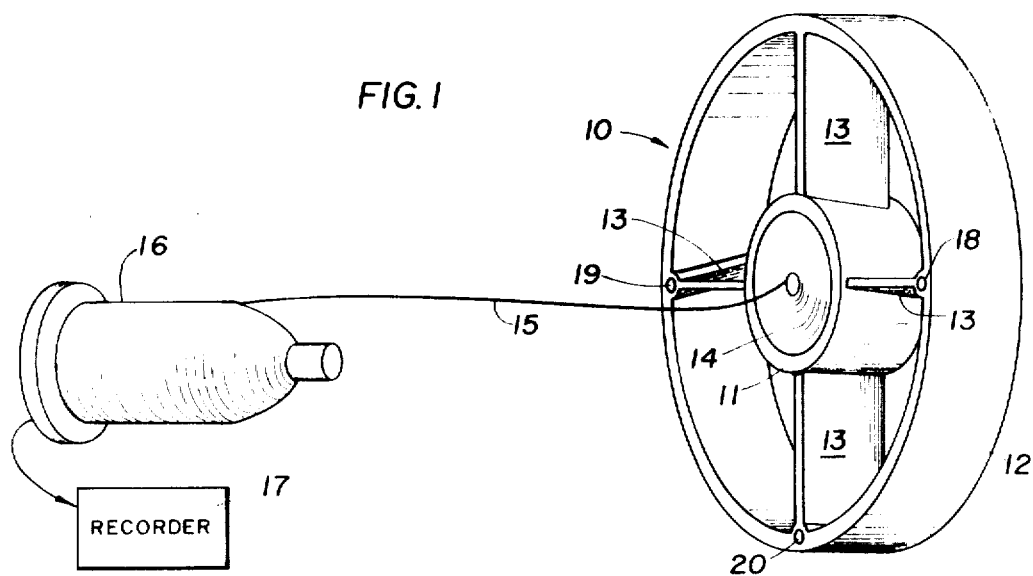
FIG. 1 illustrates a temperature and humidity gradient measuring device according to one embodiment of the invention.

Referring now to the drawing, and more in particular to FIG. 1, therein is illustrated a device comprising a rotor 10 having a hub 11 and an outer annular rim 12 interconnected by a plurality of radially extending vanes 13. The rotor may be formed of a plastic material. A coil of wire 14 is fixedly mounted within the hub 11, and one end 15 of the wire is adapted to be paid out from the center of the coil to a spool of wire 16. The spool of wire 16 is mounted by an conventional means on the surface vessel, and the other end of the wire from the spool 16 is connected to a suitable recorder 17 also on the surface vessel. The wire 15 may be a multiple conductor wire.

A thermistor 18 is provided on the rotor 10, either imbedded in the surface of the rotor or extending therefrom, and the thermistor 18 is connected to a pair of conductors at the other end of the coil 14. This connection may, if desired, be imbedded in the rotor. A second thermistor 19 is also provided on the rotor, in the same manner as the thermistor 18, and preferably symmetrically arranged in order to prevent unbalance of the rotor. The thermistor 19 is also connected to the ends of conductors of the coil 14. This thermistor is mounted as a wet bulb thermistor, and thus, may be surrounded by an absorbent material adapted to be impregnated with fluid to permit measurement of humidity. In addition, a sea electrode 20 may also be provided on the rotor 10 to establish a conductive path when the rotor 10 falls into the sea. The manner of interconnecting the measuring devices 18, 19 and 20 to the recording device may be conventional, such as described in the U.S. Pat. No. 3,221,556. While the arrangement is illustrated as having a stationary spool 16 and a coil within the rotor, it will be apparent that one of these coils of wire may be omitted.

Figure 2:
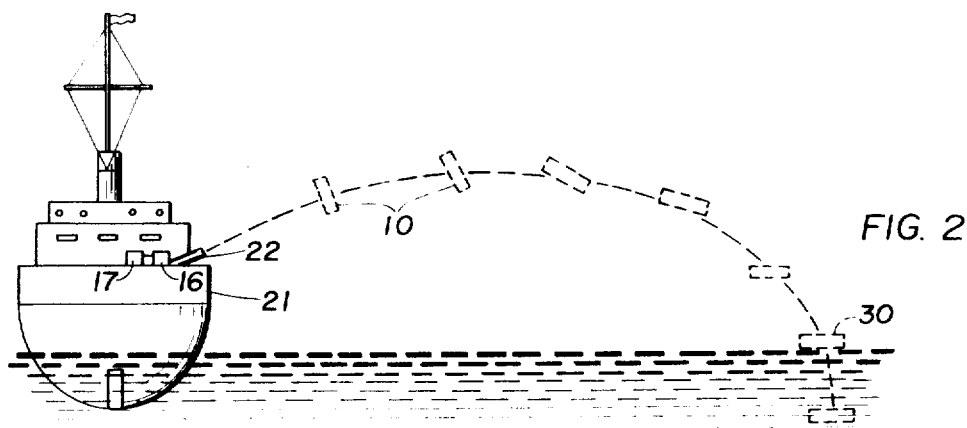
FIG. 2 illustrates the manner of operation of the device of FIG. 1.

Referring now to FIG. 2, the spool 16 and recorder 17 are therein shown as mounted on the deck of a ship 21. A launching device 22 is provided for propelling the rotor 10 in a predetermined trajectory. The launching device 22 which is preferably gimbal mounted, may, for example, be a conventional spring operated device that projects the rotor upwardly and outwardly from the ship 21, and simultaneously provides the rotor with a rotary motion. The initial movement of the rotor is in a direction parallel onto the axis of the rotor, so that the resistance to movement by the rotor during the ascending portion of the trajectory is minimal. As the rotor moves along its trajectory, as shown in FIG. 2 by the successive positions of the rotor, the axis of the rotor gradually shifts toward a vertical alignment. This shifting of the position of the axis of the rotor may be enhanced by distribution of the weight in the rotor to provide a pendulum type action. When the rotor reaches its highest position in the trajectory and starts descending, the rotary motion of the rotor provides a lifting force on the rotor, due to the alignment of the vanes 13, so that the descent of the rotor is slowed. As an example, the time constant of the one type of thermistor which may be employed on the rotor is between 0.4 and 0.5 seconds. With such a thermistor, the rotor should be designed to have a descent ratio of about 4 to 5 feet per second during the descending portion of the trajectory.

When the rotor contacts the surface of the ocean, as shown at 30, the sea electrode on the rotor will provide an indication at the recorder 17 of such contact. This may be employed as a reference point for computing the positions of the rotor during its previous descent. Alternatively, the sea electrode may be omitted, with the step change in temperature on the recorder being employed to indicate the contact of the rotor with the water surface. The recording of temperature may continue after contact of the device with the water surface, in order to provide an indication of the temperature of the upper layers of the water. This measurement may be useful, since conventional bathythermograph devices are more adapted to measurement of water temperature at greater depths, and the present device will thus permit an undisturbed indication of the temperature depth profile of the water to a depth of, for example, 10 feet.

Figure 3:
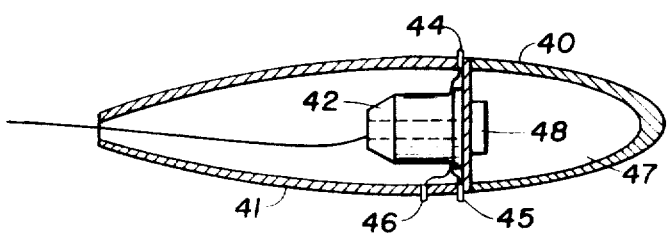
FIG. 3 illustrates a missile for measuring temperature and humidity gradients according to another embodiment of the invention.

As an alternative, according to another embodiment of the invention as illustrated in FIG. 3, the air probe may be in the form of a missile having a nose portion 40 and a separable rear portion 41. The rear portion 41 is hollow and contains a spool 42 of wire, with one end of the wire extending outwardly through an aperture for connection to the recording instrument. A thermistor 44, a wet bulb thermistor 45, and a sea electrode 46 may be provided connected to the other end of the wire of spool 42.

The nose portion 40 of the missile contains a parachute 47 adapted to be released to slow the descent of the missile in the latter portion of its trajectory, and for this purpose a release mechanism 48, such as a spring operated release, device is provided in order to separate the nose and rear portions of the missile to effect the release of the parachute. The missile may be launched in the same manner as the rotor of FIG. 2, without, of course, the necessity of imparting a rotary motion to the device. It will be obvious that other structures may also be employed according to the teachings of the invention, in order to provide a necessary characteristics of the air probe.

According to the invention, it is necessary to have a high mass to frontal area of drag ratio during the ascending portion of the trajectory, and a slow descent, which may be maintained by increasing the drag at the highest point in its flight. Various combinations of these techniques may also be employed.

What I claim is:

1. Apparatus for measuring the characteristics of the air over a body of water from a vessel on said body of water, comprising air probe means, recording means on said vessel, means on said vessel for projecting said probe means in a trajectory over said body of water, said probe means including at least one measuring means for measuring a characteristic of said air, and conductive means continuously interconnecting said measuring means and recording means and including at least one spool of wire positioned to pay out said conductive means during movement of said probe means in its trajectory, said probe means further comprising means operative during the descending portion of said trajectory for slowing descending movement of said probe means with respect to movement during the ascending portion of said trajectory.

2. The apparatus of claim 1 wherein said air probe means comprises a rotor, and said means for projecting said probe means comprises means for projecting said rotor from said vessel in a direction parallel to the axis of said rotor means, whereby the axis of said rotor means shifts to a substantially vertical direction during descending portion of said trajectory.

3. The apparatus of claim 2 wherein said rotor means comprises a hub, and said spool of wire is positioned within said hub and adapted to pay out said conductive means from the center of said spool of wire.

4. The apparatus of claim 1 wherein said air probe means comprises a missile having a rear portion and a releasable nose portion, said nose portion including a parachute, for releasing during the descending portion of said trajectory, and said tail portion incloses said spool of wire.

5. The apparatus of claim 1 wherein said air probe means includes a thermistor, a wet bulb thermistor and sea electrode means connected to said conductive means.